May 31, 1949. A. MUELLER 2,471,885
HYDRAULIC VALVE ACTUATING MECHANISM
Filed April 10, 1944 2 Sheets-Sheet 1

Inventor:
Alfred Mueller.
By Joseph O. Lange,
Atty.

May 31, 1949.   A. MUELLER   2,471,885
HYDRAULIC VALVE ACTUATING MECHANISM
Filed April 10, 1944   2 Sheets-Sheet 2
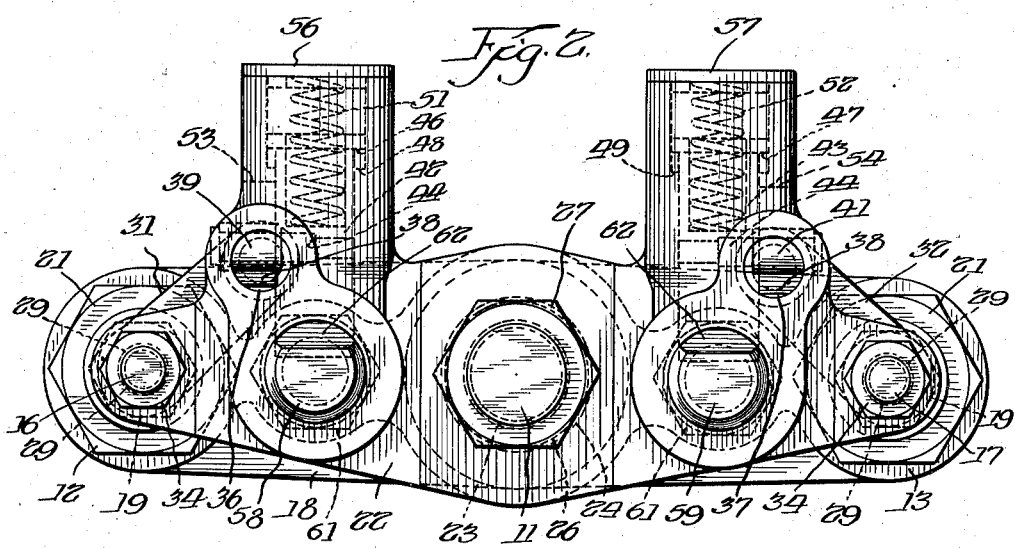
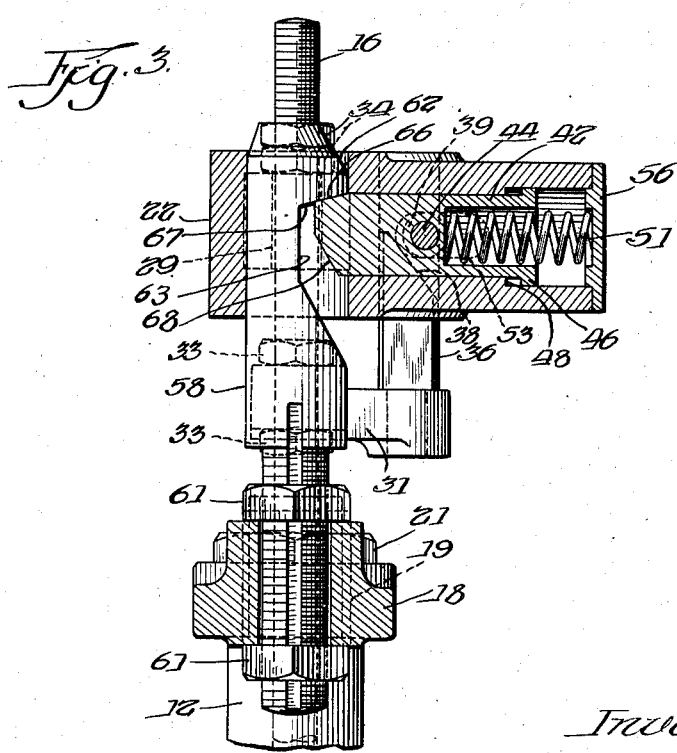
Inventor
Alfred Mueller
By Joseph O. Lange
Atty.

UNITED STATES PATENT OFFICE 2,471,885

HYDRAULIC VALVE ACTUATING MECHANISM

Alfred Mueller, Berwyn, Ill., assignor to Crane Co., Chicago, Ill., a corporation of Illinois Application April 10, 1944, Serial No. 530,426

5 Claims. (Cl. 137—139)

This invention relates to valve actuating means or the like and is more particularly concerned with hydraulically operated valves in which piston means are provided for actuating the valve closure member. It has for an object the provision of improved hydraulic operating means which is inexpensive in construction, reliable in operation and which will not readily get out of order.

This invention further contemplates the provision of improved hydraulic operating means embodying mechanical locking means for automatically securing the valve closure member in seated position irrespective of the ultimate position of the valve, and further provides means responsive to unseating movement of the hydraulic operating means for unlocking said mechanical locking means.

A further object of this invention resides in the provision of yieldably resistant means for holding the valve closure member in seated position, said yieldably resistant means being adjustable to exert a variable predetermined seating force for holding the closure member in seated position.

This invention embodies other novel features, details of construction and arrangement of parts which are hereinafter set forth in the specification and claims and illustrated in the accompanying drawings, forming part thereof, wherein:

Fig. 2 is a plan view of the hydraulic operator shown in Fig. 1.

Fig. 3 is a sectional view taken along the line 3—3 of Fig. 1, showing the latch mechanism.

Figure 1:
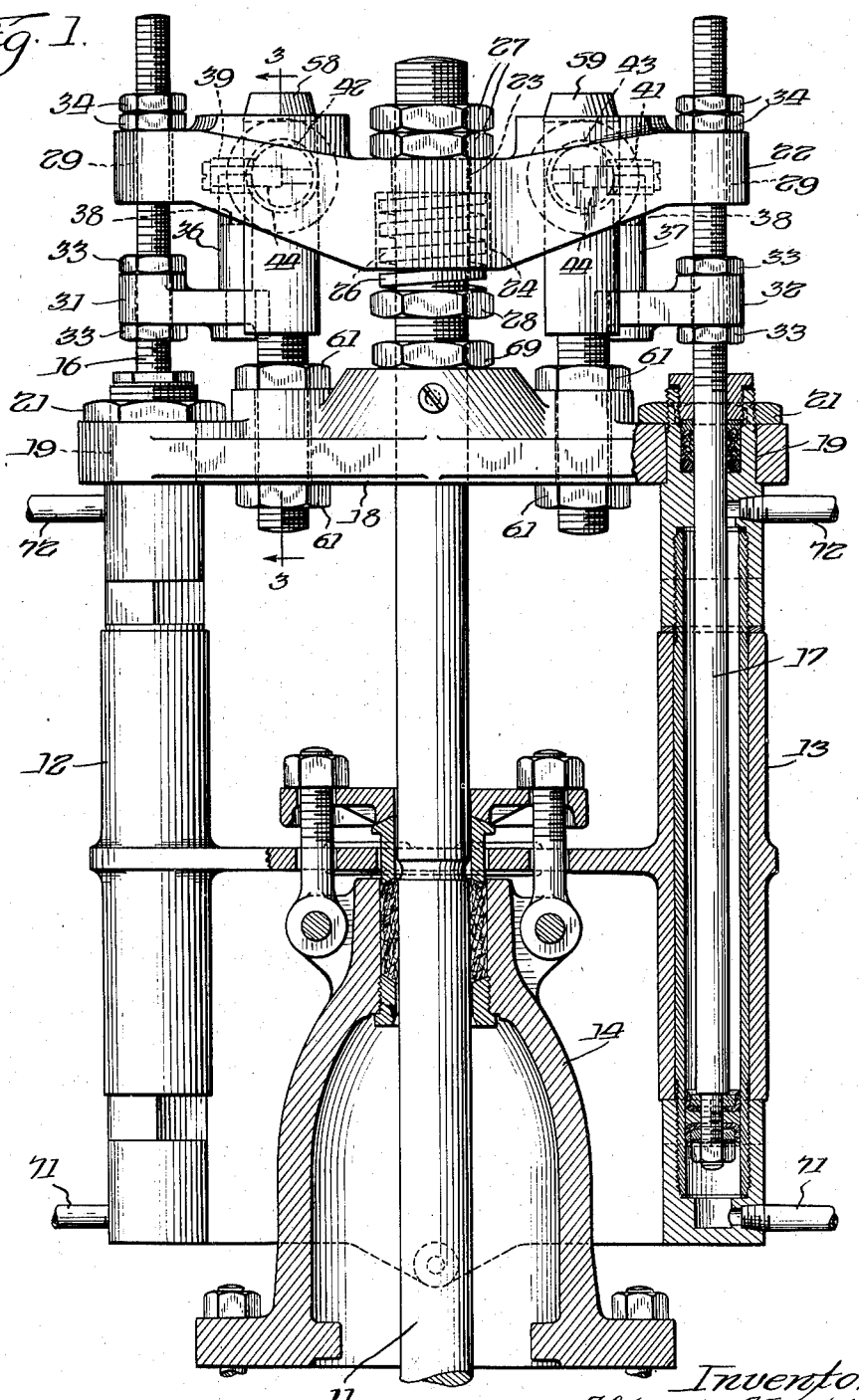
Fig. 1 is a fragmentary side elevational view partly in cross-section showing a hydraulically operated valve embodying features of this invention.

Referring now to the drawings and particularly to Fig. 1 for a better understanding of this invention, it should be understood that a gate valve body (not shown) provided with the usual passage and seats accommodates a gate type disc which is secured to a stem 11 for reciprocable movement into and out of seating engagement with body seats.

As shown in Fig. 1, a pair of cylinders 12 and 13 are secured to the valve bonnet 14 to receive piston members 16 and 17, respectively. The bonnet is secured in the usual manner to the valve body. A crosshead member 18 is provided with apertures 19 at its ends to receive the upper ends of the cylinders 12 and 13 and is held against displacement therefrom by means of nuts 21. A stem actuating bar 22 is formed with an aperture 23 to receive the threaded upper end of the stem 11. Mounted within a recess 24 formed in the underside of the actuating bar 22 and encircling the stem is provided a helical compression spring 26. The spring 26 and bar 22 are engaged between top adjustment nuts 27 and a bottom adjustment nut 28 which are threaded onto the stem 11.

The outer ends of the stem actuating bar 22 are provided with apertures 29 to receive the upper ends of the piston members 16 and 17. Latch release arms 31 and 32 are adjustably positioned on the piston members 16 and 17 by means of nuts 33, and stop nuts 34 are provided on the outer ends of the piston members. Latch release fingers 36 and 37 are mounted on the arms 31 and 32 and have their outer ends beveled at 38 for engagement with rollers 39 and 41, respectively, journaled on latch rods 42 and 43, respectively, by means of screws 44. The latch rods are reciprocably mounted in the stem actuating bar 22 and formed with shoulders 46 and 47, respectively, for engagement with shoulders 48 and 49, respectively, to limit their travel inwardly under pressure exerted by their respective compression springs 51 and 52, respectively. Guide slots 53 and 54 are formed in the stem actuating bar 22 to receive the rollers 39 and 41 to prevent rotational movement of the latch rods. Covers 56 and 57 are secured to the stem actuating bar 22 for engagement with the outer ends of the springs 51 and 52.

Catch arms 58 and 59 are adjustably mounted in apertures provided in the cross member 18 by means of nuts 61, and each has its outer end beveled at 62 and formed with notches 63, for locking engagement with the latch rods 42 and 43, respectively. The inner ends of the latch rods are suitably beveled at 66 to provide a locking wedge engagement with tapered shoulders 67 formed on the catch arms; and are also beveled at 68 for sliding engagement with the beveled ends 62 of the catch arms. A stop nut 69 is threaded onto the stem for engagement with the cross member 18.

In the operation of the valve thus described, the closure member (not shown) is moved from its seated position shown to its open position by admitting fluid under pressure to the cylinders through the conduits 71 and from any suitable source of supply, not shown. An outward movement of the pistons acts through the latch release fingers 36 and 37 to first move the latch rods 42 and 43 rearwardly out of locking engagement with the catch arm shoulders 67, and then to engage the nuts 33 against the ends of the stem actuating bar 22 to unseat the closure member and raise it to its open position.

In moving the closure member from its open to its closed and seated position and vice versa, fluid under pressure is admitted to the cylinders through the conduits 72 to move the pistons downwardly and upwardly, respectively. The stem actuating bar 22 is engaged by the nuts 34 on the piston members and acts through the compression spring 26, adjustment nut 28 and stem 11 to seat the closure member 9, in which position the latch rods are thus disposed in locking engagement under the catch arm shoulders 67 and the spring 26 is compressed to exert sufficient force to resist unseating movement of the closure member. The stop nut 69 engages the cross member 18 to limit the downward travel of the stem 11.

It will thus be seen that the closure member of a gate valve, or a globe valve may be seated by means of a predetermined amount of force and automatically secured in locked seated position until the piston means are actuated to unseat and open the valve.

While this invention has been shown in but one form it is obvious to those skilled in the art that it is not so limited but is susceptible of various changes and modifications without departing from the spirit thereof or the scope of the appended claims.

I claim:

1. In a valve actuating mechanism, the combination including a closure member and a stem therefore, hydraulic operating means for reciprocating the stem for seating and unseating the closure member, a stem actuating bar cooperating with the said stem and hydraulic operating means, resilient means operable upon seating of the closure member for yieldably resisting unseating movement of the closure member, latch means supported by the said stem actuating bar for automatically locking the closure member in its seated position, and means actuated by unseating movement of the hydraulic operating means for unlocking said latch means to permit unseating movement of the closure member.

2. In a valve actuating mechanism, the combination including a closure member and a stem therefor, a stem actuating bar, hydraulic operating means for reciprocating the stem actuating bar for seating and unseating the closure member, the stem actuating bar connecting the said stem with the said hydraulic operating means, resilient means operable upon seating of the closure member for yieldably resisting unseating movement of the closure member, latch means cooperating with the said stem actuating bar for automatically locking the closure member in its seated position, the said latch means being actuated by unseating movement of the hydraulic operating means for unlocking said latch means to permit unseating movement of the closure member, and means cooperating with the said stem actuating bar for varying the force exerted by said resilient means for holding the closure member in seated position.

3. In a valve actuator or the like, the combination including a reciprocably movable stem, a crosshead therefor, fluid actuated means cooperating with the said crosshead, the said fluid actuated means including cylinders held against displacement relative to the said crosshead, a stem actuating bar formed to receive the upper portion of the said stem, resilient means cooperating with the stem and bearing against the said actuating bar, piston members reciprocably movable within the cylinders, latch release arms adjustably positioned on the said piston members, latch rods reciprocably mounted in the stem actuating bar, latch release means mounted on the said arms and having their outer ends formed for engagement with the said latch rods, catch arms mounted in the said crosshead, the said catch arms having their outer ends engageable with the said latch rods, the inner end of the latter members engaging the said catch arms, the said latch rods being limited in their inward travel and slidably engaging the said catch arms.

4. Valve actuating means of the character described, the combination including a reciprocably movable stem, a crosshead therefor, fluid actuated means cooperating with the said crosshead, the said fluid actuated means including cylinders held against displacement relative to the said crosshead, a stem actuating bar providing journaling means for the upper portion of the said stem, adjustable resilient means bearing against the said actuating bar for regulating the load at which the valve may be seated, piston members movable within the cylinder means, latch release arms adjustable relative to the said piston members, latch rods reciprocably mounted in the stem actuating bar, latch release fingers mounted on the said arms and having their outer ends engageable with the said latch rods, the said latch rods having means to limit their travel, catch arms adjustably mounted in the said crosshead and having their outer ends slidably engageable with the said latch rods, the inner end of the latter members being suitably beveled to engage shouldered portions on the said catch arms, the said latch rods being formed with a beveled shoulder for sliding engagement with the beveled ends of the catch arms.

5. Valve actuating means or the like, the combination including a reciprocably movable stem, a crosshead therefor, fluid actuated means cooperating with the said crosshead, the said fluid actuated means including cylinders held against displacement relative to the said crosshead, a stem actuating bar formed to receive the upper portion of the said stem, resilient means on the stem bearing against the said actuating bar, adjustment means therefor for regulating the load at which the valve may be seated, piston members movable within the cylinder means, latch release arms adjustably positioned on the said piston members, latch rods reciprocably movable in the stem actuating bar, roller means mounted on the latch rods, latch release fingers mounted on the said arms and having their outer ends beveled for engagement with the said latch rod roller means, the said latch rods being predeterminately movable toward the said stem, catch arms adjustably mounted in the said crosshead, the said catch arms having their outer ends beveled for locking engagement with the said latch rods, the inner end of the latter members being suitably beveled to engage shouldered portions on the said catch arms, the said latch rods having means for sliding engagement with the beveled ends of the catch arms.

ALFRED MUELLER.

REFERENCES CITED

The following references are of record in the file of this patent:

UNITED STATES PATENTS

| Number | Name | Date |
|---|---|---|
| 1,494,608 | Lundgren | May 20, 1924 |
| 1,977,554 | Hall | Oct. 16, 1934 |
| 2,074,772 | Brown | Mar. 23, 1937 |
| 2,127,293 | Gilman | Aug. 16, 1938 |
| 2,303,320 | Benjamin | Dec. 1, 1942 |